(12) United States Patent
Höglund et al.

(10) Patent No.: US 10,271,276 B2
(45) Date of Patent: Apr. 23, 2019

(54) OPTIMIZED MCS SELECTION FOR MACHINE TYPE COMMUNICATION

(71) Applicant: Telefonaktiebolaget L M Ericsson (publ), Stockholm (SE)

(72) Inventors: Andreas Höglund, Solna (SE); Jonas Kronander, Knivsta (SE); Hugo Tullberg, Nyköping (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 855 days.

(21) Appl. No.: 14/722,372

(22) Filed: May 27, 2015

(65) Prior Publication Data

US 2016/0353374 A1 Dec. 1, 2016

(51) Int. Cl.
*G06F 11/00* (2006.01)
*H04W 52/02* (2009.01)
(Continued)

(52) U.S. Cl.
CPC ....... *H04W 52/0209* (2013.01); *H04L 1/0003* (2013.01); *H04L 1/0009* (2013.01);
(Continued)

(58) Field of Classification Search
CPC .. H04W 4/70; H04W 72/0406; H04L 1/0003; H04L 1/0009
See application file for complete search history.

(56) References Cited

U.S. PATENT DOCUMENTS

2009/0323641 A1  12/2009  Futagi et al.
2013/0128846 A1  5/2013   Golitschek Edler von Elbwart et al.
(Continued)

FOREIGN PATENT DOCUMENTS

WO  2013066125 A1  5/2013
WO  2013182422 A1  12/2013
(Continued)

OTHER PUBLICATIONS

Author Unknown, "Technical Specification Group Radio Access Network; Evolved Universal Terrestrial Radio Access (E-UTRA); Physical layer procedures (Release 12)," Technical Specification 36.213, Version 12.1.0, 3GPP Organizational Partners, Mar. 2014, 186 pages.
(Continued)

*Primary Examiner* — Bo Hui A Zhu
(74) *Attorney, Agent, or Firm* — Withrow & Terranova, PLLC

(57) ABSTRACT

Systems and methods are disclosed herein for reducing power consumption and/or decreasing latency for a wireless device in a wireless communications system. In particular, the systems and methods disclosed herein are particularly beneficial for Machine Type Communication (MTC) devices, but are not limited thereto. In some embodiments, a method of operation of a node of a wireless communications system comprises determining a Modulation and Coding Scheme (MCS) that is optimized for MTC for one of an uplink from a MTC device to a base station and a downlink from the base station to the MTC device, and using the MCS with respect to the one of the uplink from the MTC device to the base station and the downlink from the base station to the MTC device. By optimizing the MCS, power consumption by the MTC device and/or latency can be reduced.

26 Claims, 11 Drawing Sheets

(51) Int. Cl.
  *H04L 1/00*   (2006.01)
  *H04W 72/04*  (2009.01)
  *H04L 5/00*   (2006.01)
  *H04W 4/70*   (2018.01)
  *H04W 88/08*  (2009.01)

(52) U.S. Cl.
  CPC .......... *H04L 1/0015* (2013.01); *H04L 5/0064* (2013.01); *H04W 4/70* (2018.02); *H04W 72/0406* (2013.01); *H04W 88/08* (2013.01); *Y02D 70/1262* (2018.01); *Y02D 70/21* (2018.01)

(56) References Cited

U.S. PATENT DOCUMENTS

| | | | |
|---|---|---|---|
| 2013/0315152 A1 | 11/2013 | Ratasuk et al. | |
| 2014/0036889 A1 | 2/2014 | Kim et al. | |
| 2014/0112289 A1 | 4/2014 | Kim et al. | |
| 2014/0198677 A1* | 7/2014 | Xu | H04L 1/0026 370/252 |
| 2014/0301288 A1 | 10/2014 | Koc et al. | |
| 2015/0085729 A1* | 3/2015 | Majjigi | H04W 52/12 370/311 |
| 2016/0226649 A1* | 8/2016 | Papasakellariou | H04L 5/0057 |
| 2016/0278102 A1* | 9/2016 | Bontu | H04B 7/0632 |
| 2016/0309427 A1* | 10/2016 | Cho | H04W 72/04 |

FOREIGN PATENT DOCUMENTS

| | | |
|---|---|---|
| WO | 2014098358 A1 | 6/2014 |
| WO | 2014110785 A1 | 7/2014 |
| WO | 2014113243 A2 | 7/2014 |
| WO | 2015160291 A1 | 10/2015 |

OTHER PUBLICATIONS

International Search Report for International Patent Application No. PCT/SE2014/050461, dated Jan. 26, 2015, 4 pages.
Author Unknown, "Technical Specification Group Radio Access Network; Study on provision of low-cost MTC UEs based on LTE; (Release 11)," Technical Report 36.888, Version 1.0.1, 3GPP Organizational Partners, May 2012, 40 pages.
International Search Report for International Patent Application No. PCT/IB2016/053103, dated Sep. 7, 2016, 16 pages.
Examination Report for European Patent Application No. 15771293.6, dated Feb. 16, 2018, 5 pages.

* cited by examiner

FIG. 3

Table 7.1.7.1-1: Modulation and TBS index table for PDSCH

| MCS index $I_{MCS}$ | Modulation Order $Q_m$ | TBS index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | |
| 31 | 6 | |

Table 7.1.7.2.1-1: Transport block size table (dimension 27 × 110)

| $I_{TBS}$ | $N_{PRB}$ | | | | | | | | | |
|---|---|---|---|---|---|---|---|---|---|---|
| | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |
| 9 | 136 | 296 | 456 | 616 | 776 | 936 | 1096 | 1256 | 1416 | 1544 |
| 10 | 144 | 328 | 504 | 680 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | 224 | 488 | 744 | 1000 | 1256 | 1544 | 1800 | 2024 | 2280 | 2536 |
| 14 | 256 | 552 | 840 | 1128 | 1416 | 1736 | 1992 | 2280 | 2600 | 2856 |
| 15 | 280 | 600 | 904 | 1224 | 1544 | 1800 | 2152 | 2472 | 2728 | 3112 |
| 16 | 328 | 632 | 968 | 1288 | 1608 | 1928 | 2280 | 2600 | 2984 | 3240 |
| 17 | 336 | 696 | 1064 | 1416 | 1800 | 2152 | 2536 | 2856 | 3240 | 3624 |
| 18 | 376 | 776 | 1160 | 1544 | 1992 | 2344 | 2792 | 3112 | 3624 | 4008 |
| 19 | 408 | 840 | 1288 | 1736 | 2152 | 2600 | 2984 | 3496 | 3880 | 4264 |
| 20 | 440 | 904 | 1384 | 1864 | 2344 | 2792 | 3240 | 3752 | 4136 | 4584 |
| 21 | 488 | 1000 | 1480 | 1992 | 2472 | 2984 | 3496 | 4008 | 4584 | 4968 |
| 22 | 520 | 1064 | 1608 | 2152 | 2664 | 3240 | 3752 | 4264 | 4776 | 5352 |
| 23 | 552 | 1128 | 1736 | 2280 | 2856 | 3496 | 4008 | 4584 | 5160 | 5736 |
| 24 | 584 | 1192 | 1800 | 2408 | 2984 | 3624 | 4264 | 4968 | 5544 | 5992 |

OPTIMIZED MCS SELECTION FOR MACHINE TYPE COMMUNICATION

TECHNICAL FIELD

The present disclosure relates to Machine Type Communication (MTC) and, in particular, to reducing power consumption and/or latency for MTC in a wireless communication system.

BACKGROUND

In current Third Generation Partnership Project (3GPP) Long Term Evolution (LTE) systems, a User Equipment device (UE) sends a Scheduling Request (SR) to an enhanced or evolved Node B (eNB) when the UE wishes to transmit data in the uplink. The SR is accompanied with a Buffer Status Report (BSR). Based on the BSR, the eNB will give the UE an uplink grant with a number of Physical Resource Blocks (PRBs) and a Modulation and Coding Scheme (MCS) with which the UE should transmit its data in the uplink. The number of PRBs and the MCS correspond to a defined Transport Block Size (TBS). Thus, the selection of the number of PRBs and the MCS is oftentimes referred to as TBS selection and is done for a given target Block Error Rate (BLER).

For mobile broadband services, the target BLER is relatively high (e.g., 10%) since it is more beneficial from a systems perspective to keep interference levels in check and rely on Hybrid Automatic Repeat Request (HARQ) retransmissions if needed. Further, since there are usually free resources in the network, the eNB scheduler oftentimes gives the UE an uplink grant having a TBS that is substantially larger than that which is needed for the uplink buffer size reported in the BSR. This is beneficial because more data may be added to the uplink buffer between the time at which the UE transmits the BSR and the time at which the UE is allowed to transmit. If the TBS for the uplink grant is larger than the uplink buffer size when the UE transmits, the UE must include padding, or dummy, bits in the uplink transmission in order to match the TBS of the uplink grant. The UE is obligated to transmit exactly as dictated by the eNB scheduler.

In addition to Mobile Broadband (MBB) services, Fifth Generation (5G) systems will support Machine Type Communication (MTC). MTC will be both massive MTC, which focuses on very large numbers of simple devices transmitting small data payloads (sensors, actuators, etc.), and critical MTC, which focuses on low latency applications (e.g., industrial control). In both cases, the majority of devices are battery operated and frequent charging is not feasible. For massive MTC, a battery life of around ten years is often mentioned as a target, and this puts high requirements on UE power consumption.

Patent Cooperation Treaty (PCT) Patent Application Publication No. WO 2014/113243 A2, entitled "Channel State Information and Adaptive Modulation and Coding Design for Long-Term Evolution Machine Type Communications," describes systems and methods for minimizing the number of Channel State Information (CSI) transmissions from a MTC UE to an eNB, which in turn reduces power consumption by the MTC UE.

While WO 2014/113243 A2 teaches reducing power consumption by a MTC UE by decreasing the amount of CSI transmissions, there remains a need for systems and methods reducing power consumption and/or decreasing latency of a MTC device.

SUMMARY

Systems and methods are disclosed herein for reducing power consumption and/or decreasing latency for a wireless device in a wireless communications system. In particular, the systems and methods disclosed herein are particularly beneficial for Machine Type Communication (MTC) devices, but are not limited thereto. In some embodiments, a method of operation of a node of a wireless communications system comprises determining a Modulation and Coding Scheme (MCS) that is optimized for MTC for one of an uplink from a MTC device to a base station and a downlink from the base station to the MTC device, and using the MCS with respect to the one of the uplink from the MTC device to the base station and the downlink from the base station to the MTC device. By optimizing the MCS, power consumption by the MTC device and/or latency can be reduced.

In some embodiments, determining the MCS comprises determining the MCS that is optimized for MTC for the uplink from the MTC device to the base station, and using the MCS comprises using the MCS with respect to the uplink from the MTC device to the base station.

In some embodiments, determining the MCS that is optimized for MTC for the uplink comprises determining the MCS that is optimized for MTC for the uplink based on a MTC-specific Transport Block Size (TBS) selection.

In some embodiments, determining the MCS that is optimized for MTC for the uplink comprises obtaining an initial uplink MCS based on a target Block Error Rate (BLER) for non-MTC devices, the initial uplink MCS corresponding to an initial TBS, and reducing the MCS from the initial uplink MCS to a less aggressive uplink MCS that satisfies a reduced TBS, as compared to the initial TBS, desired for the MTC device.

In some embodiments, the method further comprises decreasing an uplink transmit power for uplink data transmissions from the MTC device to the base station using the MCS that is optimized for MTC for the uplink such that a BLER for the uplink data transmissions is equal to a target BLER for MTC devices, wherein the target BLER for MTC devices is less than a target BLER for non-MTC devices.

In some embodiments, the node is the MTC device. Further, in some embodiments, the method further comprises receiving an uplink grant from a base station of the wireless communications system containing an indication that the MTC device is permitted to determine and use the MCS optimized for MTC devices for a corresponding uplink data transmission. Determining the MCS that is optimized for MTC for the uplink and using the MCS with respect to the uplink are performed upon receiving the uplink grant containing the indication that the MTC device is permitted to determine and use the MCS optimized for MTC devices for the corresponding uplink data transmission. In some embodiments, the method further comprises, prior to receiving the uplink grant, transmitting a Scheduling Request (SR) to the base station containing an indication that the MTC device would like to determine and use the MCS that is optimized for MTC for the uplink.

In some embodiments, using the MCS with respect to the uplink comprises transmitting uplink data using the MCS. In some embodiments, the method further comprises transmitting an indication of the MCS to the base station.

In some embodiments, the node is the base station. Further, in some embodiments, using the MCS with respect to the uplink from the MTC device to the base station comprises transmitting an uplink grant to the MTC device comprising an indication of the MCS and receiving an uplink data transmission from the MTC device using the MCS.

In some embodiments, the method further comprises determining that the MTC device is a MTC device, and determining the MCS that is optimized for MTC for the uplink and using the MCS with respect to the uplink are performed upon determining that the MTC device is a MTC device. In some embodiments, determining that the MTC device is a MTC device comprises determining that the MTC device is a MTC device based on an indication in a SR received from the MTC device, subscription information for the MTC device, a context of the MTC device, and/or physical resources utilized by the MTC device that are indicative of the MTC device being a MTC device.

In some embodiments, determining the MCS comprises determining the MCS that is optimized for MTC for the downlink from the base station to the MTC device, and using the MCS comprises using the MCS with respect to the downlink from the base station to the MTC device. Further, in some embodiments, determining the MCS that is optimized for MTC for the downlink comprises obtaining an initial downlink MCS based on a target BLER for non-MTC devices, the initial downlink MCS corresponding to an initial TBS, and reducing the MCS from the initial downlink MCS to a less aggressive downlink MCS that satisfies a reduced TBS, as compared to the initial TBS, desired for the MTC device.

Further, in some embodiments, the method further comprises decreasing a downlink transmit power for downlink data transmissions from the base station to the MTC device using the MCS that is optimized for MTC for the downlink such that a BLER for the downlink data transmissions is equal to a target BLER for MTC devices, wherein the target BLER for MTC devices is different than (e.g., lower than) the target BLER for non-MTC devices.

In other embodiments, a method of operation of a base station in a cellular communications network comprises transmitting an uplink grant to a MTC device, the uplink grant comprising an indication of an initial MCS; receiving an uplink data transmission from the MTC device, the uplink data transmission using an unknown MCS that is equal to or less aggressive than the initial MCS indicated in the uplink grant; and detecting the unknown MCS used for the uplink data transmission from the MTC device. In some embodiments, detecting the unknown MCS comprises determining that decoding of the uplink data transmission using the initial assumption on MCS failed and, upon determining that decoding of the uplink data transmission using the initial MCS failed, attempting to decode the uplink data transmission assuming that a more robust MCS was used by the MTC device.

Embodiments of a node for a wireless communications system are also disclosed.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 3 illustrates one example of the process of FIG. 2 with respect to an existing Modulation and Transport Block Size (TBS) index table and TBS table provided in 3GPP Technical Specification (TS) 36.213 V12.1.0;

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Systems and methods are disclosed herein for reducing power consumption and/or decreasing latency for a wireless device in a wireless communications system. In particular, the systems and methods disclosed herein are particularly beneficial for Machine Type Communication (MTC) devices, but are not limited thereto. As used herein, a MTC device, or MTC User Equipment device (UE), is any machine device (as opposed to a user operated device such as, for example, a smart phone) that benefits from being connected, e.g., a sensor, an actuator, etc. A MTC device has the characteristic of a small payload size as compared to non-MTC devices. Conversely, a non-MTC device, or non-MTC UE, is a conventional UE such as, for example, a smart phone, tablet computer, etc.

Figure 1:
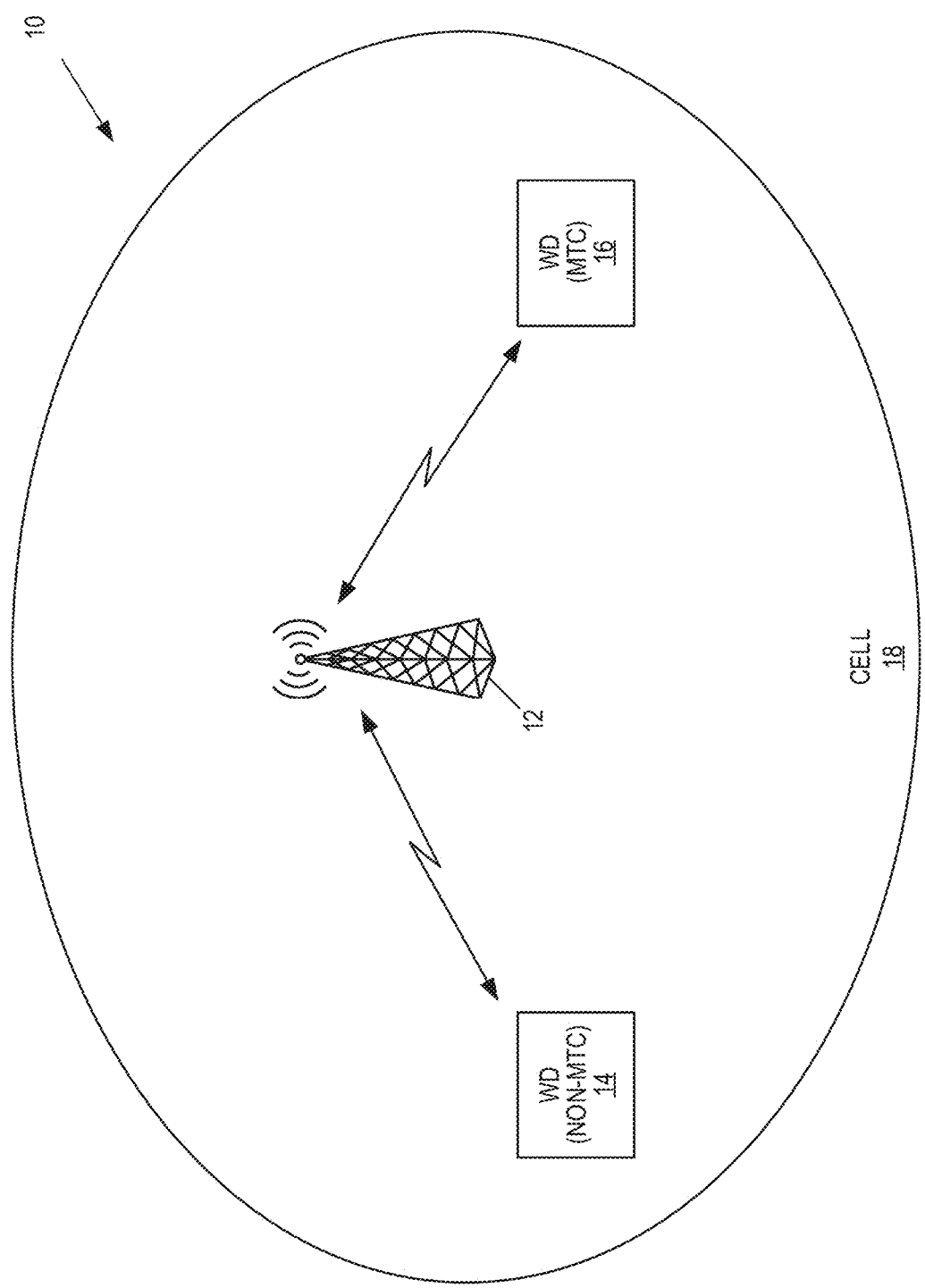
FIG. 1 illustrates one example of a cellular communications network in which Modulation and Coding Scheme (MCS) optimization for Machine Type Communication (MTC) devices is provided according to some embodiments of the present disclosure.

In this regard, FIG. 1 illustrates one example of a cellular communications network 10 including a base station 12 (e.g., an evolved or enhanced Node B (eNB)) serving wireless devices 14 and 16 (e.g., UEs) in a cell 18. In this example, the wireless device 14 is a non-MTC device, whereas the wireless device 16 is a MTC device. As such, the wireless device 14 is also referred to herein as a non-MTC device 14, and the wireless device 16 is also referred to herein as a MTC device 16. In some preferred embodiments, the cellular communications network 10 is a Third Generation Partnership Project (3GPP) Long Term Evolution (LTE) network and, as such, 3GPP LTE terminology is sometimes used herein. However, the present disclosure is not limited to 3GPP LTE. Rather, the concepts disclosed herein can be implemented in any suitable wireless communication system.

As discussed below in detail, Modulation and Coding Scheme (MCS) selection for the MTC device 16 is performed differently than MCS selection for the non-MTC device 14. In particular, MCS selection for the MTC device 16 is optimized for MTC services (i.e., massive MTC services or critical MTC services). In particular, the MCS selection is optimized to adapt to the relatively small payload size of uplink/downlink transmission for the MTC device 16. As described herein, for the uplink, the optimized MCS is an MCS having a TBS that is equal to or slightly greater than the uplink buffer size for the MTC device 16. More specifically, given a payload size of the MTC device 16 and a certain number of physical channel resources, the optimization of the MCS strives to minimize the amount of padding or otherwise non-information-carrying bits, with the overall objective to save battery in the MTC device 16 by reducing retransmissions/processing.

In some embodiments, the relatively small payload size of the MTC device 16 is leveraged to enable use of a more robust MCS with a relatively small Transport Block Size (TBS) and thereby achieve a lower Block Error Rate (BLER) for the MTC device 16 as compared to that of the non-MTC device 14. The lower BLER reduces the number of Hybrid Automatic Repeat Request (HARQ) retransmissions and, as a result, reduces power consumption at the MTC device 16 (which is important for massive MTC) and reduces latency (which is important for critical MTC). In other embodiments, the relatively small payload size is leveraged to enable use of a more robust MCS with a relatively small TBS together with transmit power reduction to achieve a target BLER that is equal to or less than the target BLER for non-MTC devices. Particularly for the uplink, reducing the transmit power results in a reduction in power consumption at the MTC device 16 even if using the same target BLER as used for non-MTC devices. Further, in some embodiments, both a reduced BLER and a reduced transmit power are utilized to provide both power reduction and reduced latency. In this way, high quality radio links can be advantageous for MTC Key Performance Indicators (KPIs) and not only to achieve higher bitrates.

Figure 2:
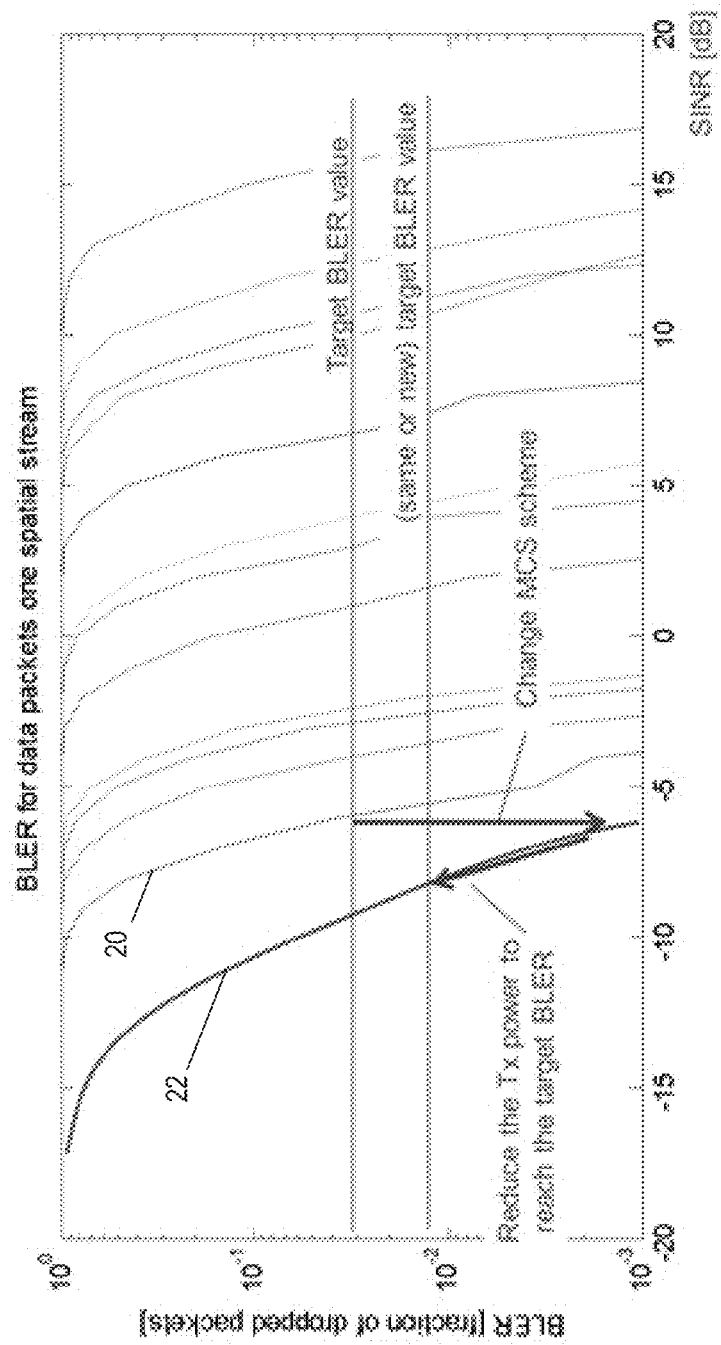
FIG. 2 is a graphical illustration of one example of a modified MCS selection scheme for an uplink data transmission from the MTC device to the base station of FIG. 1 according to some embodiments of the present disclosure.

FIG. 2 is a graphical illustration of one example of a modified MCS selection scheme for an uplink data transmission from the MTC device 16 to the base station 12 of FIG. 1 according to some embodiments of the present disclosure. As discussed below, this process may be performed by the MTC device 16, by the base station 12, or by some other network node (e.g., a network node in a core network of the cellular communications network 10). In this example, an initial MCS, represented by a curve 20, is selected using, e.g., a conventional MCS selection procedure. In some embodiments, the MTC device 16 sends an uplink Scheduling Request (SR) to the base station 12. The MTC device 16 sends a Buffer Status Report (BSR) to the base station 12 in association with the uplink SR. The BSR includes a size of an uplink buffer of the MTC device 16 (i.e., the amount of data in the uplink buffer of the MTC device 16 waiting to be transmitted). Upon receiving the uplink SR, the base station 12 selects the initial MCS for the uplink transmission based on a quality of the uplink channel between the MTC device 16 and the base station 12. The quality of the uplink channel is represented as Signal to Interference plus Noise Ratio (SINR) in FIG. 2, but may alternatively be represented by some other channel quality metric.

Particularly when the uplink channel is good, the initial MCS corresponds to a TBS that is much larger than the uplink buffer size of the MTC device 16. According to some embodiments of the present disclosure, this enables selection of a more robust, or less aggressive, MCS for the uplink data transmission. This more robust MCS is represented by a curve 22 in FIG. 2. The more robust MCS results in a lower BLER, as shown. In some embodiments, the MTC device 16 transmits using the more robust MCS, and thus lower BLER, without any transmit power reduction. This results in a reduced number of retransmissions (or higher reliability). In other embodiments, in addition to using the more robust MCS, transmit power for the uplink data transmission may be reduced such that the resulting BLER meets a target BLER for MTC devices. In some embodiments, the target BLER for MTC devices is lower than the target BLER for non-MTC devices. As a result of the reduced target BLER, the number of retransmission is reduced, which reduces power consumption at the MTC device 16 and reduces latency. The reduced transmit power also reduces power consumption at the MTC device 16. In other embodiments, the target BLER for MTC devices is equal to the target BLER for non-MTC devices. In this case, the gains in terms of power reduction are the result of the reduced transmit power.

Notably, in some embodiments, some uplink transmissions from MTC devices use the more robust MCS without transmit power reduction while other uplink transmissions use the more robust MCS with transmit power reduction. The former may, for example, be utilized for uplink data transmission related to critical MCS services whereas the latter may, for example, be utilized for uplink data transmissions related to massive MCS services.

FIG. 3 illustrates one example of the process of FIG. 2 with respect to an existing Modulation and TBS index table and TBS table provided in 3GPP Technical Specification (TS) 36.213 V12.1.0. Importantly, this is only an example provided for illustration purposes. This example should not be construed as limiting the scope of the concepts described herein. As illustrated, the base station 12 observes a very good channel and, as a result, selects 64 Quadrature Amplitude Modulation (64QAM) (MCS index=26) for the initial MCS. As illustrated, MCS index=26 corresponds to TBS index=24. Using the TBS table, the TBS index corresponds to a TBS size of 584 bits assuming $N_{PRB}$=1. Thus, using the initial MCS selected by the base station 12, the MTC device 16 can determine, or estimate, that transmission of 585 bits is possible when using the initial MCS selected by the base station 12. The MTC device 16 uses MTC-specific MCS and TBS selection to increase the robustness of the MCS to MCS index=7 and TBS index=7, which corresponds to a TBS of 104 bits and Binary Phase Shift Keying (BPSK) as the MCS. More specifically, the MTC device 16 knows that it only has 100 bits in its uplink buffer. Using this knowledge, the MTC device 16 identifies, in this example, 104 as the desired TBS, which corresponds to the TBS index=7. The Modulation and TBS index table can then be used to determine the MCS index, which in this example is MCS index=7, that corresponds to the TBS index=7. The MCS index=7 corresponds to BPSK.

When there is no reduction in transmit power, the more robust MCS results in a substantially reduced BLER. As discussed above, in some embodiments, the more robust MCS is utilized by the MTC device 16 without transmit power reduction. This results in fewer retransmissions and, therefore, power reduction at the MTC device 16 and reduced latency. In other embodiments, the MTC device 16 also decreases transmit power to reach the target BLER for MTC devices, which, as discussed above, may be less than or equal to the target BLER for non-MTC devices. Optionally, in some embodiments, the MTC device 16 indicates the optimized MCS to the base station 12. Note that since the example of FIG. 3 uses legacy MCSs in the tables, this example does not take into account any new coding and/or coding of padding bits.

Figure 4:
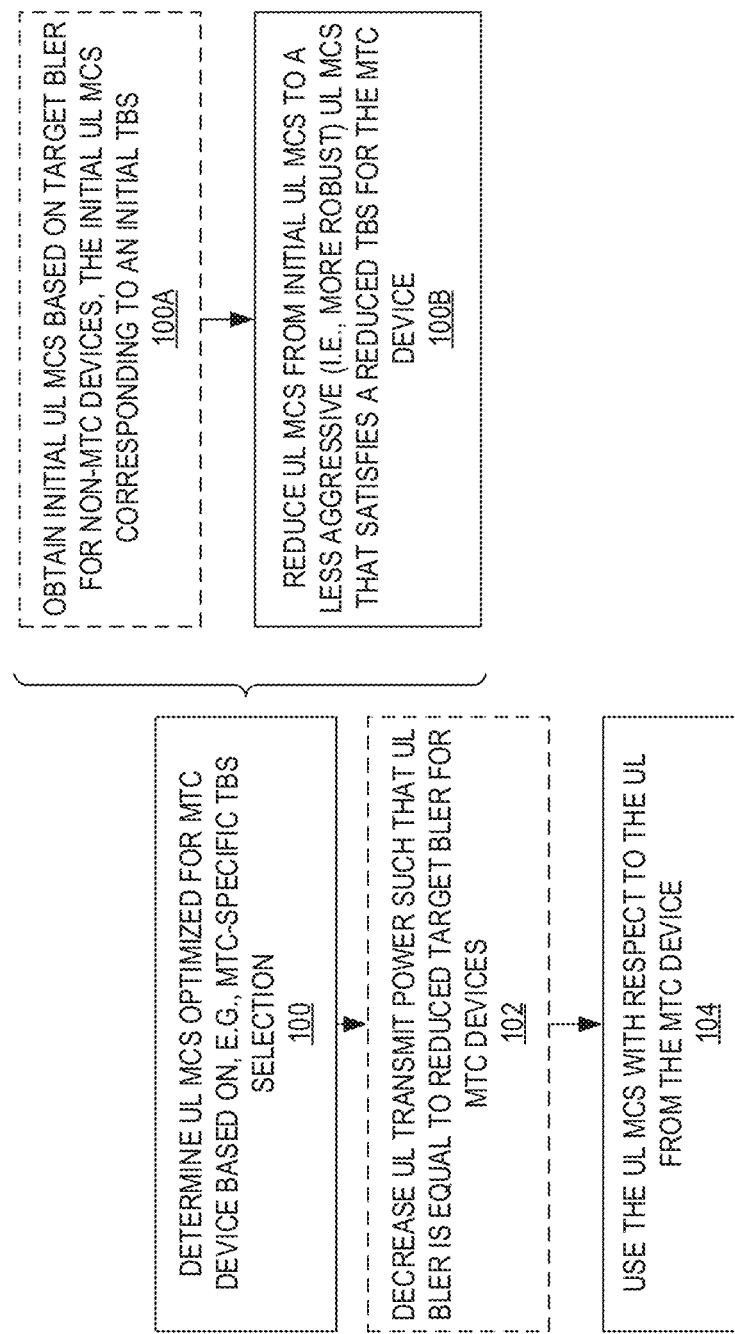
FIG. 4 is a flow chart that illustrates a process for optimizing MCS selection for an uplink data transmission from the MTC device to the base station of FIG. 1 according to some embodiments of the present disclosure.

FIG. 4 is a flow chart that illustrates a process for optimizing MCS selection for an uplink data transmission from the MTC device 16 to the base station 12 according to some embodiments of the present disclosure. This process can be performed by any node, i.e., the MTC device 16 or a network node in the cellular communications network 10 such as, e.g., the base station 12. Notably, while figures, such as FIG. 4, describe processes in terms of "steps," these "steps" can be performed in any desired order or even in parallel unless explicitly stated or otherwise required.

As illustrated, the node determines an uplink MCS optimized for the MTC device 16 based on, e.g., an MTC-specific TBS selection (step 100). As discussed above, in some embodiments, the uplink MCS is optimized for the MTC device 16 by leveraging the relatively small uplink buffer size of the MTC device 16 as compared to a much larger TBS that would be used for mobile broadband services. More specifically, in some embodiments, the node obtains an initial uplink MCS for the MTC device 16 based on a target BLER for non-MTC devices (step 100A). Notably, step 100A is not required in all embodiments, as indicated by the dashed box. The initial uplink MCS corresponds to an initial TBS. This initial TBS is relatively large compared to the amount of data to be transmitted by the MTC device 16. As such, the node reduces the uplink MCS from the initial uplink MCS to a less aggressive, or more robust, uplink MCS that satisfies a reduced TBS for the MTC device 16 (step 100B). As used herein, reducing the MCS means changing the MCS to a MCS having a reduced data rate. A reduced MCS is also referred to herein as a less aggressive or more robust MCS.

Once the optimized uplink MCS is determined, in some embodiments, the node decreases an uplink transmit power of the MTC device 16 such that the uplink BLER for the MTC device 16 is equal to a reduced target BLER for MTC devices (step 102). The target BLER for MTC devices is "reduced" in that, in this embodiment, it is less than the target BLER for non-MTC devices. The node then uses the optimized uplink MCS with respect to the uplink from the MTC device 16 to the base station 12 (step 104). For instance, in some embodiments, the node is the MTC device 16, and the MTC device 16 uses the optimized MCS by transmitting data on the uplink using the optimized MCS. In other embodiments, the node is the base station 12, and the base station 12 uses the optimized MCS by, e.g., transmitting an uplink grant to the MTC device 16 including an indication of the optimized MCS and receiving an uplink data transmission from the MTC device 16 using the optimized MCS.

Figure 5:
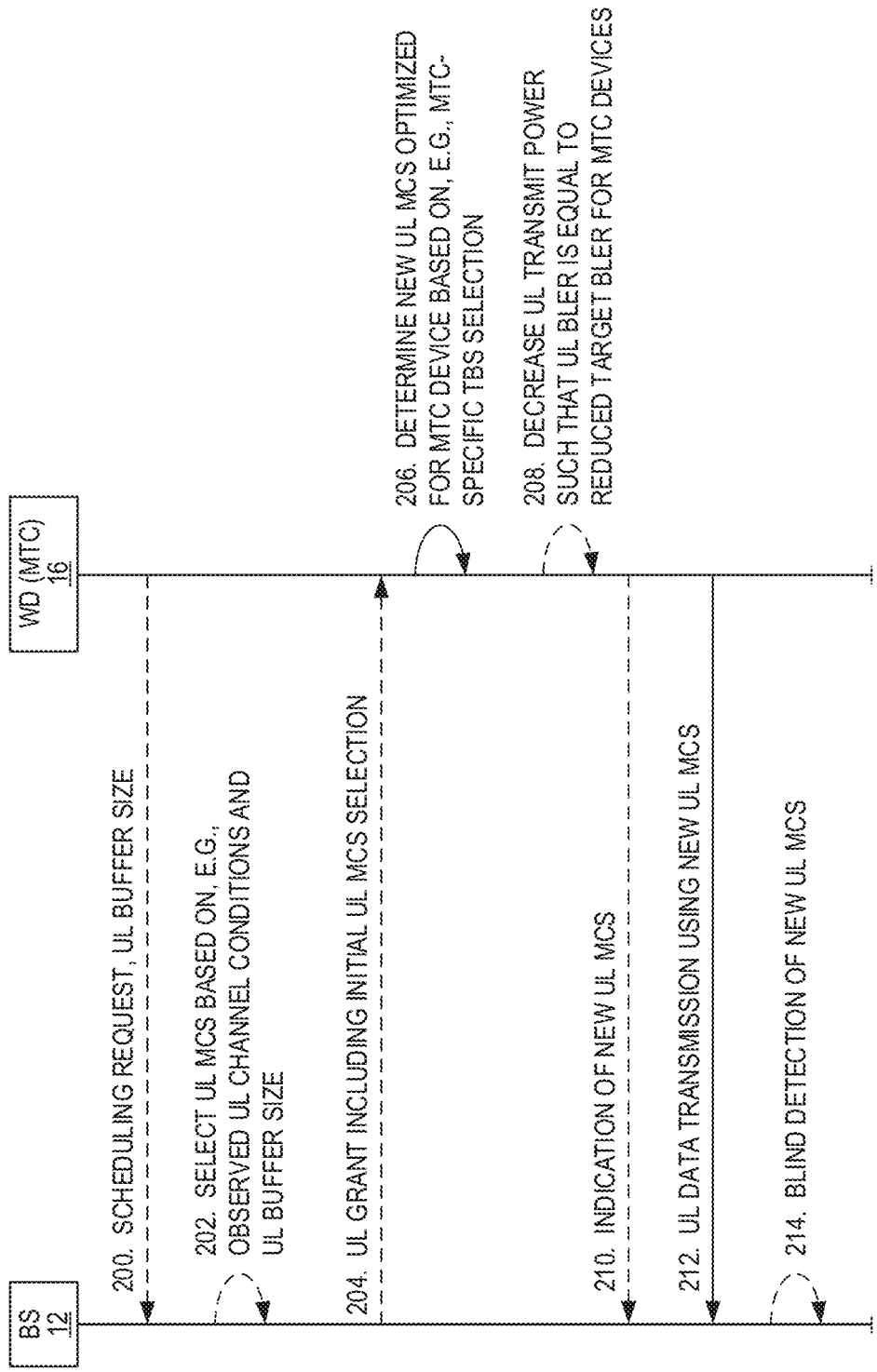
FIG. 5 illustrates the operation of the base station and the MTC device of FIG. 1 according to some embodiments in which the MTC device performs the process of FIG. 4.

FIG. 5 illustrates the operation of the base station 12 and the MTC device 16 according to some embodiments in which the MTC device 16 performs the process of FIG. 4. Notably, optional steps are indicated by dashed lines. As illustrated, the MTC device 16 sends a SR and optionally a BSR including the uplink buffer size to the base station 12 (step 200). The base station 12 selects an initial uplink MCS based on, e.g., the observed uplink channel conditions (e.g., uplink SINR), the target BLER for non-MTC devices, and the uplink buffer size (step 202). The initial MCS may be selected using, e.g., a conventional MCS selection process for Mobile Broadband (MBB) services. The initial uplink MCS has a corresponding TBS that is significantly larger than the uplink buffer size for the MTC device 16. The base station 12 then sends an uplink grant to the MTC device 16 including an indication of the initial uplink MCS (step 204).

Notably, in some embodiments, uplink grant includes an indication (e.g., bit sequence, flag, or the like) that the MTC device 16 is permitted to determine and use an uplink MCS that is optimized for MTC. The base station 12 may provide this indication upon, e.g., (a) receiving a request from the MTC device 16 to be allowed to determine and use an optimized MCS for MTC where this request may be included in or associated with the SR of step 200 or (b) a determination by the base station 12 that the MTC device 16 is a MTC device (e.g., based on subscription information for the MTC device 16, a context of the MTC device 16, use of physical resources by the MTC device 16 that are detected to MTC or MTC services, or the like).

Upon receiving the uplink grant and, optionally, the indication from the base station 12 that the MTC device 16 is permitted to determine and use an optimized MCS, the MTC device 16 determines a new uplink MCS that is optimized for MTC based on, e.g., MTC-specific TBS selection, as discussed above (step 206). In some embodiments, the MTC device 16 also decreases uplink transmit power such that the uplink BLER is equal to a reduced target BLER for MTC devices, as discussed above (step 208). Notably, steps 206 and 208 correspond to steps 100 and 102 of FIG. 4.

In some embodiments, the MTC device 16 provides an indication of the new, or optimized uplink MCS to the base station 12 (step 210). This indication may be transmitted to the base station 12 in any suitable manner. The MTC device 16 then uses the optimized uplink MCS by transmitting uplink data to the base station 12 according to the uplink grant but using the new, or optimized, uplink MCS (step 212). In some embodiments, if the MTC device 16 has not indicated the new uplink MCS to the base station 12, the base station 12 blindly detects the new uplink MCS using any appropriate blind uplink MCS detection technique (step 214).

Figure 6:
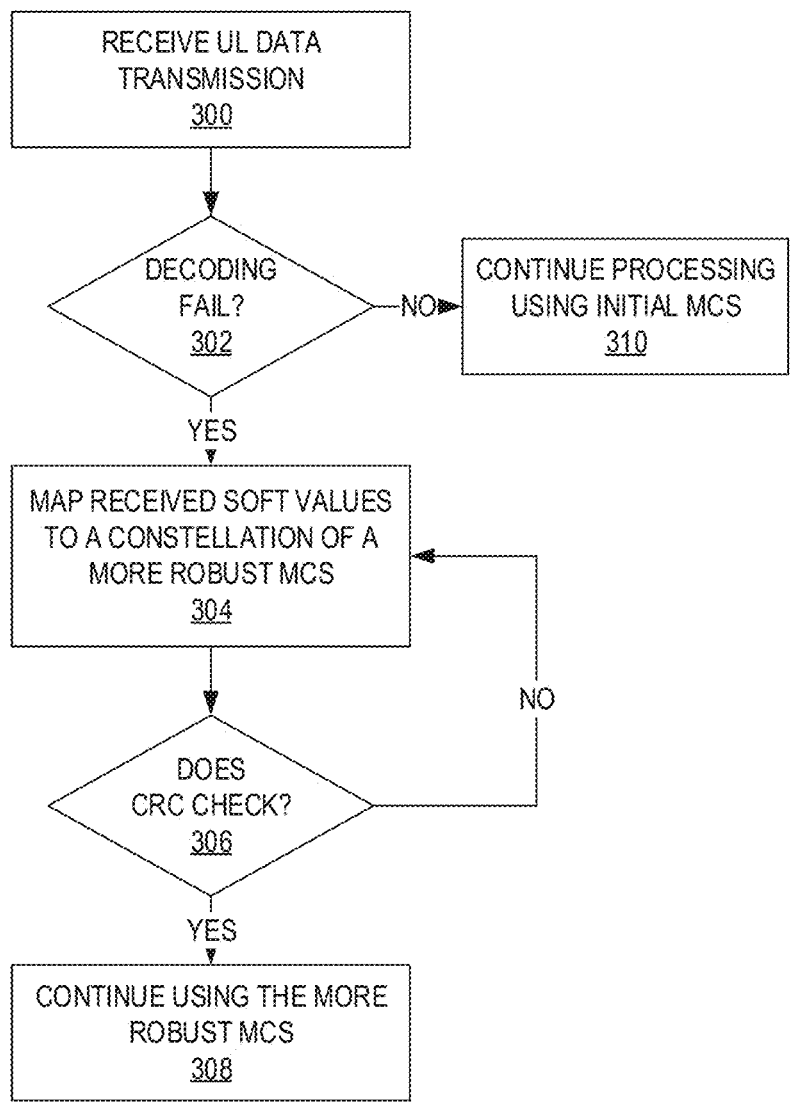
FIG. 6 is a flow chart that illustrates a process for blindly detecting the uplink MCS at the base station according to some embodiments of the present disclosure.

FIG. 6 is a flow chart that illustrates a process for blindly detecting the uplink MCS at the base station 12, e.g., in step 214 of FIG. 5 according to some embodiments of the present disclosure. As illustrated, the base station 12 receives an uplink data transmission from the MTC device 16 (step 300). The base station 12 attempts to decode the uplink data transmission using, e.g., the initial MCS indicated in the uplink grant. If decoding fails (step 302; YES), the base station 12 attempts to decode the uplink data transmission using a more robust MCS. In particular, in this example, the base station 12 maps received soft symbol values for the received uplink data transmission to a constellation of a more robust MCS using the Euclidean distance closest point of the constellation of the more robust MCS (step 304). More specifically, the soft symbol values represent samples in the I-Q plane and, as such, the soft symbol values can be mapped to the closet constellation point of a different (e.g., more robust) signal constellation using, e.g., Euclidean distance. In doing so, a new bit sequence is obtained using the constellation of the more robust MCS. The Cyclic Redundancy Check (CRC) will be successful only for the bit sequence obtained by the correct MCS assumption.

If the CRC is unsuccessful (step 306, NO), the process returns to step 304 where the base station 12 attempts to decode the uplink data transmission using another MCS that is more robust than the initial uplink MCS indicated in the uplink grant. Once the CRC checks (step 306; YES), the MCS used for the uplink data transmission has been detected, and the base station 12 continues operation using the detected MCS (step 308). Returning to step 302, if decoding using the initial uplink MCS did not fail (i.e., was successful), the uplink data transmission uses the initial MCS and, as such, the base station 12 continues processing using the initial uplink MCS (step 310).

Figure 7:
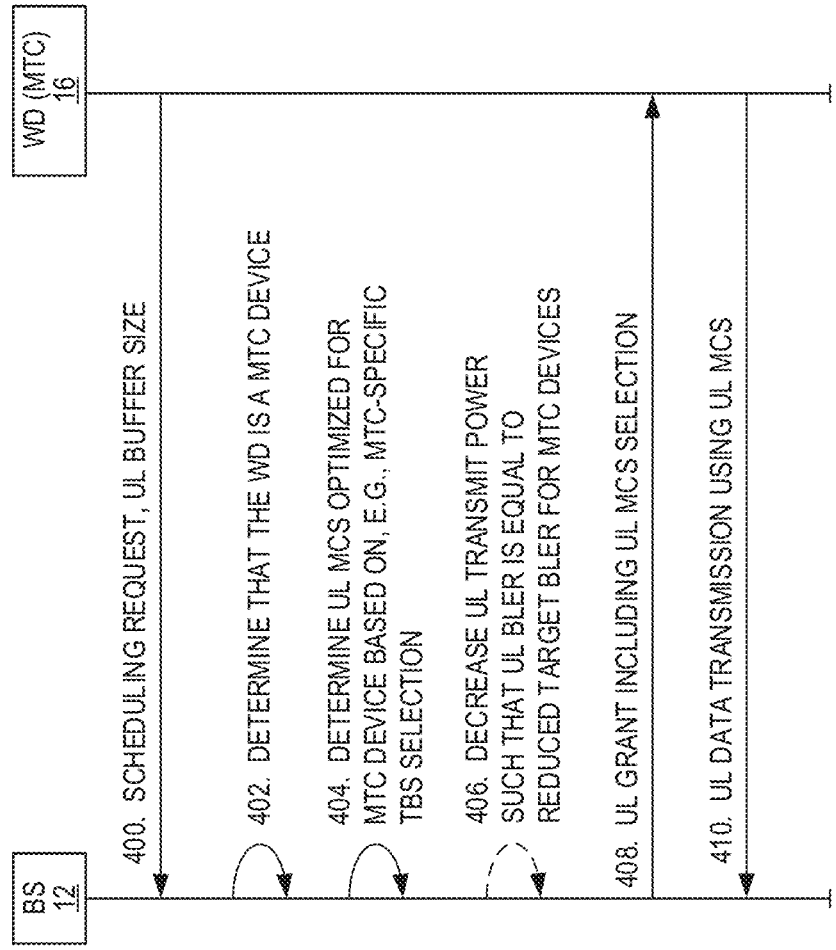
FIG. 7 illustrates the operation of the base station and the MTC device of FIG. 1 according to some embodiments in which the base station performs the process of FIG. 4.

FIG. 7 illustrates the operation of the base station 12 and the MTC device 16 according to some embodiments in which the base station 12 performs the process of FIG. 4. As illustrated, the MTC device 16 sends a SR and a BSR including the uplink buffer size to the base station 12 (step 400). The base station 12 determines whether the MTC device 16 is an MTC device or a non-MTC device (step 402). This determination may be made based on, e.g., an indication in the SR, subscription information for the MTC device 16, a context of the MTC device 16, resources utilized by the MTC device 16 (e.g., the MTC device 16 uses physical resources (e.g., time and/or frequency resources) dedicated for a certain purpose such as, for example, MTC or MTC service(s)), or the like.

Upon determining that the MTC device 16 is a MTC device, the base station 12 determines an uplink MCS for the MTC device 16 that is optimized for MTC based on, e.g., MTC-specific TBS selection, as discussed above (step 404). In some embodiments, the base station 12 also decreases uplink transmit power for the MTC device 16 such that the uplink BLER is equal to a reduced target BLER for MTC devices, as discussed above (step 406). Here, the decrease in uplink transmit power needs to be emphasized to mean that the base station 12 makes an uplink transmit power optimization for the MTC device 16. Notably, steps 404 and 406 correspond to steps 100 and 102 of FIG. 4. The base station 12 then uses the optimized MCS with respect to the uplink by sending an uplink grant to the MTC device 16 including an indication of the optimized uplink MCS (step 408) and receiving uplink data transmitted by the MTC device 16 according to the uplink grant using the optimized uplink MCS (step 410). Notably, if the uplink transmit power is optimized by the base station 12, an indication of the optimized uplink transmit power allocation is included in the uplink grant.

Figure 8:
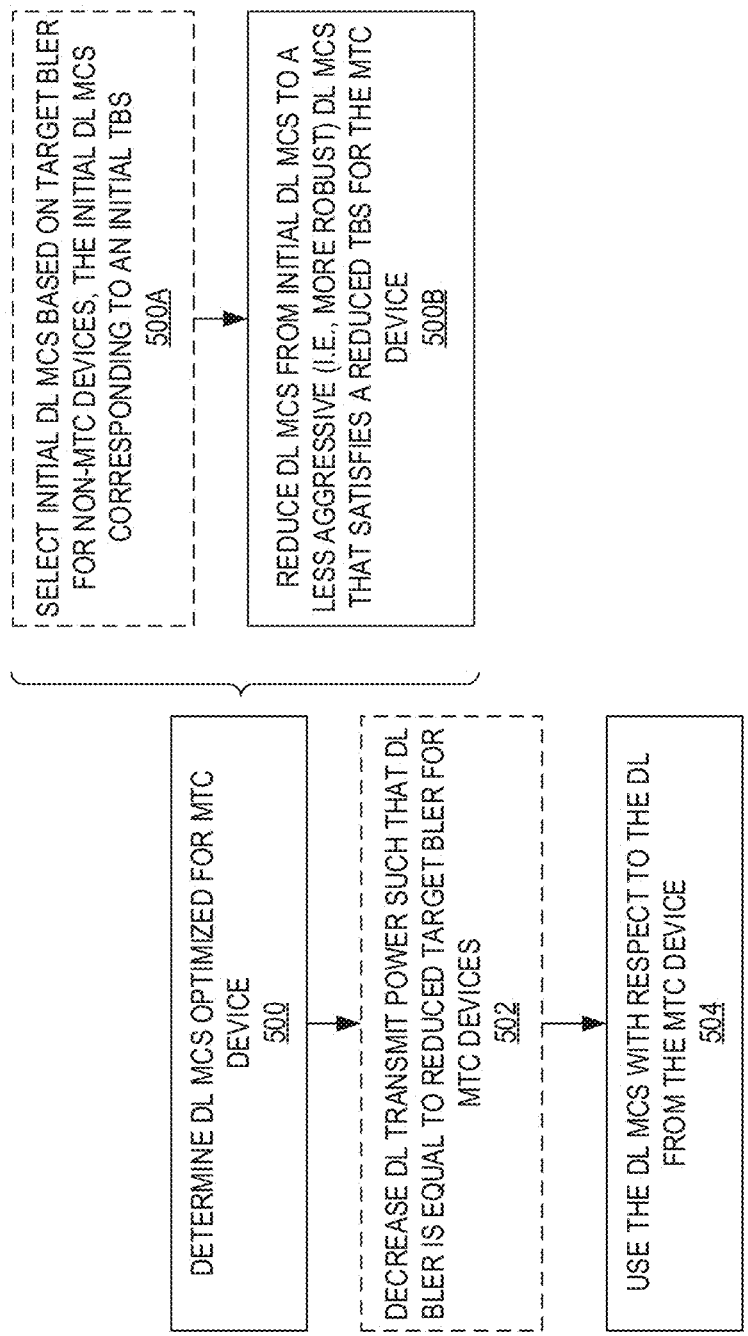
FIG. 8 is a flow chart that illustrates the operation of a node (e.g., a network node such as the base station) to optimize downlink MCS selection for the MTC device of FIG. 1 according to some embodiments of the present disclosure.

Thus far, the description has primarily focused on uplink embodiments; however, the concepts descripted herein may also be used to optimize downlink MCS selection for the MTC device 16. In this regard, FIG. 8 is a flowchart that illustrates the operation of a node (e.g., a network node such as the base station 12) to optimize downlink MCS selection for MTC according to some embodiments of the present disclosure. As illustrated, the node determines a downlink MCS for a downlink data transmission from the base station 12 to the MTC device 16, where the downlink MCS is optimized for MTC (step 500). The downlink MCS may be optimized for MTC by, e.g., targeting a reduced BLER for MTC communication (i.e., targeting a BLER that is less than the target BLER for non-MTC devices). By targeting a reduced BLER for the downlink to the MTC device 16, the MCS selected, e.g., using any suitable MCS selection process based on a target BLER is more robust (i.e., has a lower data rate) than the MCS that would have been selected if the target BLER for non-MTC devices would have been used for MCS selection.

As an example, in some embodiments, the node selects an initial downlink MCS based on the target BLER for non-MTC devices (step 500A). The initial downlink MCS corresponds to an initial TBS. The node then reduces the downlink MCS to a less aggressive, or more robust, downlink MCS that satisfies a reduced TBS for the MTC device 16 (step 500B). Importantly, reducing the downlink MCS here means selecting a different MCS with a lower data rate to make the communication more robust to errors. As for the uplink, the TBS for the initial downlink MCS selection is typically optimized for MBB services and therefore seeks to use a large TBS to allow transmission of large amounts of data. Because the MTC device 16 is a MTC device, the base station 12 can reduce the TBS for the downlink transmission to some relatively small size that is sufficient for the MTC device 16. This TBS reduction enables the reduction in the downlink MCS to a less aggressive downlink MCS. Notably, steps 500A and 500B are only an example. For instance, in another embodiment, rather than selecting an initial downlink MCS and then modifying the initial downlink MCS, the node may utilize the concepts described herein to select the optimized MCS without first selecting an initial MCS and then modifying the initial MCS.

Once the optimized downlink MCS is determined, in some embodiments, the node decreases a downlink transmit power for the downlink to the MTC device 16 such that the downlink BLER for the MTC device 16 is equal to a reduced target BLER for MTC devices (step 502). The target BLER for MTC devices is "reduced" in that, in this embodiment, it is lower than the target BLER for non-MTC devices. The node then uses the optimized downlink MCS with respect to the downlink from the MTC device 16 to the base station 12 (step 504). For instance, in some embodiments, the node is the base station 12, and the base station 12 uses the optimized MCS by, e.g., transmitting a downlink data transmission to the MTC device 16 using the optimized MCS.

Note that while in some embodiments the process of FIG. 8 is performed by the base station 12, the process of FIG. 8 may alternatively be performed by the MTC device 16. For example, the base station 12 may send a downlink transmission/wake up signal to the MTC device 16 that seldomly wakes up (e.g., once every minute, hour, day, etc.) and for only a very short amount of time (e.g., to save power). The signal uses a previously determined and communicated (e.g., when the MTC device 16 first connected or periodically) transmit power. The signal also contains information on the size of the payload data (e.g., how many bits that will be communicated later). The MTC device 16 measures the received signal strength and derives the channel quality from the known information. Using this information and the payload data, the MTC device 16 makes the optimized MCS selection. The MTC device 16 then responds to the base station 12 with information (e.g., an index) indicating the optimal MCS based on the measured channel quality.

Figure 9:
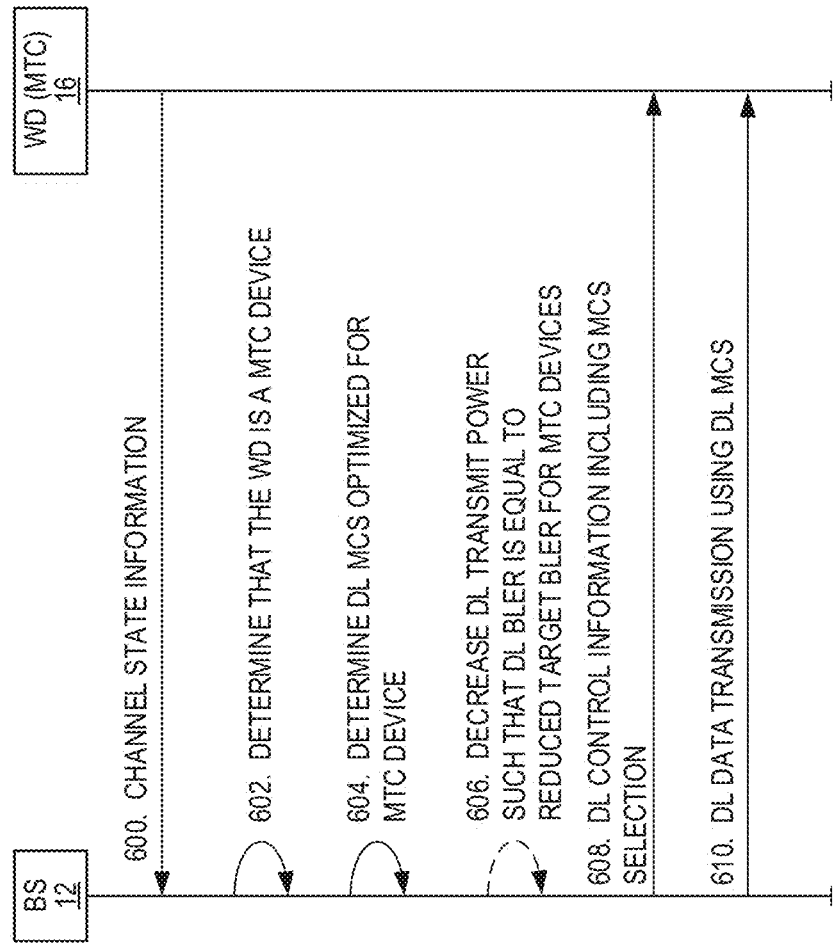
FIG. 9 illustrates the operation of the base station and the MTC of FIG. 1 according to some embodiments in which the base station performs the process of FIG. 8.

FIG. 9 illustrates the operation of the base station 12 and the MTC device 16 of FIG. 1 according to some embodiments in which the base station 12 performs the process of FIG. 8.

As illustrated, the MTC device 16 sends Channel State Information (CSI) (e.g., Channel Quality Indication (CQI), etc.) for the downlink channel to the base station 12 (step 600). The base station 12 determines that the MTC device 16 is an MTC device (step 602). This determination may be made based on, e.g., an indication transmitted by the MTC device 16, subscription information for the MTC device 16, a context of the MTC device 16, resources utilized by the MTC device 16 (e.g., the MTC device 16 uses physical resources dedicated for a certain purpose such as MTC or MTC service(s)), or the like.

Upon determining that the MTC device 16 is a MTC device, the base station 12 determines a downlink MCS for the MTC device 16 that is optimized for MTC based on, e.g., MTC-specific TBS selection, as discussed above (step 604). In some embodiments, the base station 12 also decreases downlink transmit power for the MTC device 16 such that the downlink BLER is equal to a reduced target BLER for MTC devices, as discussed above (step 606). Notably, steps 604 and 606 correspond to steps 500 and 502 of FIG. 8. The base station 12 then uses the optimized MCS with respect to the downlink by transmitting downlink control information including an indication of the optimized downlink MCS (step 608) and transmitting a downlink data transmission to the MTC device 16 according to the downlink control information using the optimized downlink MCS (step 610).

Note that while the embodiments described above could use existing modulation formats, the present disclosure is not limited thereto. New modulation formats, or MCSs, could be defined and used for the MTC device 16. For example, new modulation formats could be defined to, e.g., optimize for power consumption at the MTC device 16 in the case of massive MTC or latency in the case of critical MTC.

In some of the embodiments described above, it may be desired for the base station 12 to inform the MTC device 16 that the optimized MCS format is used for the downlink. Some examples for how the base station 12 could inform the MTC device 16 of this are as follows. As a first example, the base station 12 could, in the scheduling of the physical downlink transmission, indicate that the MCS is using the new format. For example, in the case of LTE in the (Enhanced) Physical Downlink Control Channel ((E-)PDCCH) transmission pointing out the Physical Downlink Shared Channel (PDSCH) transmission. As another example, the base station 12 could use physical resources dedicated for the use of, e.g., MTC, thereby informing the MTC device 16 that the optimized MCS format is used for the downlink.

Figure 10:
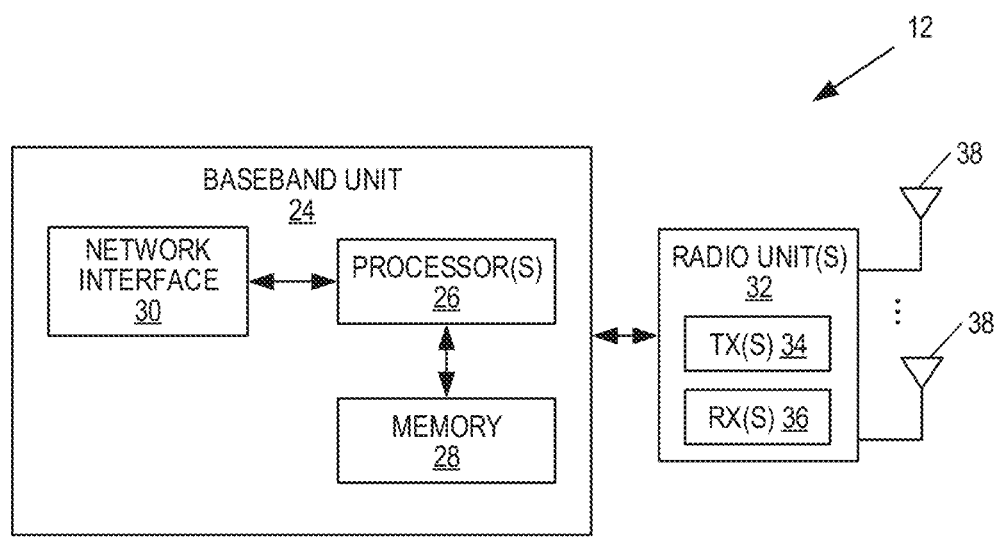
FIGS. 10 and 11 are block diagrams of the base station of FIG. 1 according to some embodiments of the present disclosure.

FIG. 10 is a block diagram of the base station 12 (e.g., an eNB) according to some embodiments of the present disclosure. This discussion is more generally applicable to any radio access node. As illustrated, the base station 12 includes a baseband unit 24 including at least one processor 26 (also referred to as a processor circuit or processor circuitry) (e.g., microprocessor(s), Central Processing Unit(s) (CPU(s)), Application Specific Integrated Circuit(s) (ASIC(s)), Field Programmable Gate Array(s) (FPGA(s)), or the like), memory 28, and a network interface 30 as well as at least one radio unit 32 including one or more transmitters 34 and one or more receivers 36 coupled to multiple antennas 38. In some embodiments, the functionality of the base station 12 is implemented in software and stored in the memory 28. This software is executable by the processor(s) 26, whereby the base station 12 operates according to any of the embodiments described herein.

In some embodiments, a computer program including instructions which, when executed by at least one processor, causes the at least one processor to carry out the functionality of the base station 12 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 28).

Figure 11:
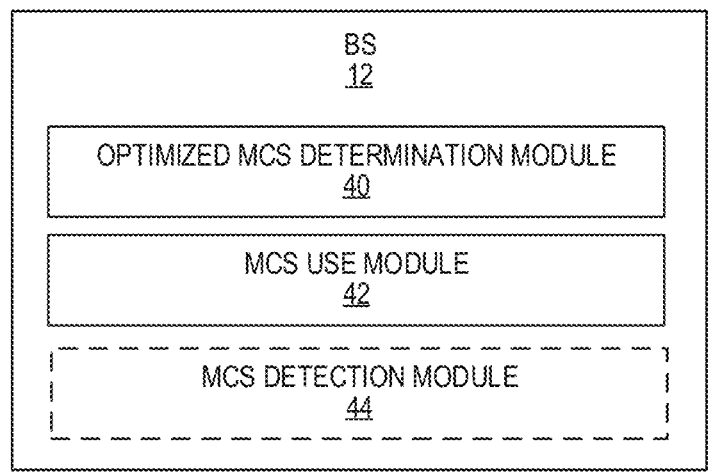

FIG. 11 is a block diagram of the base station 12 according to other embodiments of the present disclosure. The base station 12 includes an optimized MCS determination module 40, a MCS use module 42, and an optional MCS detection module 44, each of which is implemented in software. Notably, this illustration focuses on the embodiments where the base station 12 optimizes the MCS (and optionally the transmit power) for the uplink (or downlink) for the MTC device 16. The optimized MCS determination module 40 operates to determine the optimized MCS for the MTC device 16 as described above. The MCS use module 42 then uses the optimized MCS by, e.g., providing an indication of the optimized MCS to the MTC device 16 for use by the MTC device 16 for uplink transmission. The MCS detection module 44 operates to, in some embodiments, blindly detect the MCS used by the MTC device 16. As discussed above, this may be done when, for example, the MTC device 16 modifies the MCS selection made by the base station 12. In this case, the base station 12 may not include the optimized MCS determination module 40.

Figure 12:
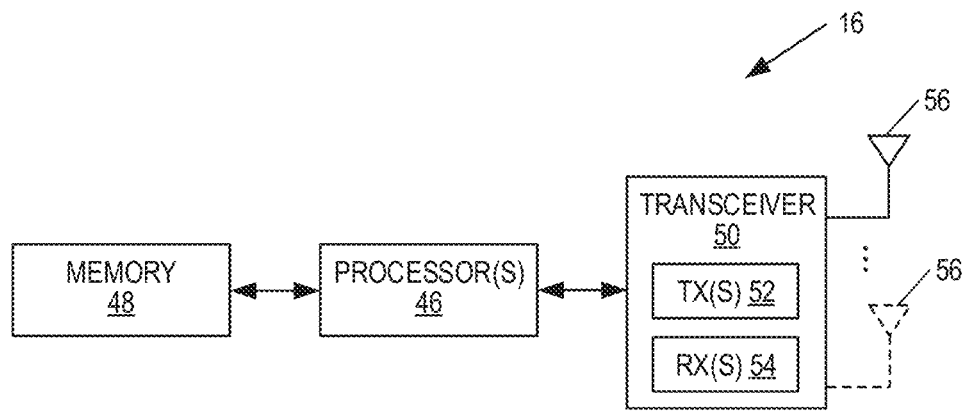
FIGS. 12 and 13 are block diagrams of the MTC device of FIG. 1 according to some embodiments of the present disclosure.

FIG. 12 is a block diagram of the MTC device 16 according to some embodiments of the present disclosure. As illustrated, the MTC device 16 includes at least one processor 46 (also referred to as a processor circuit or processor circuitry) (e.g., microprocessor(s), CPU(s), ASIC(s), FPGA(s), or the like), memory 48, and a transceiver 50 including one or more transmitters 52 and one or more receivers 54 coupled to at least one antenna 56. In some embodiments, the functionality of the MTC device 16 is implemented in software and stored in the memory 48. This software is executable by the processor(s) 46, whereby the MTC device 16 operates according to any of the embodiments described herein.

In some embodiments, a computer program including instructions which, when executed by at least one processor, causes the at least one processor to carry out the functionality of the MTC device 16 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 48).

Figure 13:
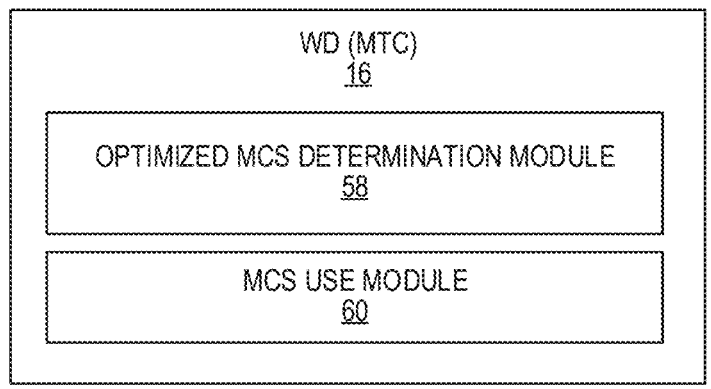

FIG. 13 is a block diagram of the MTC device 16 according to other embodiments of the present disclosure. As illustrated, the MTC device 16 includes an optimized MCS determination module 58 and an MCS use module 60, each of which is implemented in software. The optimized MCS determination module 58 operates to optimize the MCS for the uplink from the MTC device 16 as described above. The MCS use module 60 then operates to use the optimized MCS for uplink transmission.

The following acronyms are used throughout this disclosure.

3GPP Third Generation Partnership Project
5G Fifth Generation
64QAM 64 Quadrature Amplitude Modulation
ASIC Application Specific Integrated Circuit
BLER Block Error Rate
BPSK Binary Phase Shift Keying
BSR Buffer Status Report
CPU Central Processing Unit
CQI Channel Quality Indication
CRC Cyclic Redundancy Check
CSI Channel State Information
E-PDCCH Enhanced Physical Downlink Control Channel
eNB Enhanced or Evolved Node B
FPGA Field Programmable Gate Array
HARQ Hybrid Automatic Repeat Request
KPI Key Performance Indicator
LTE Long Term Evolution
MBB Mobile Broadband
MCS Modulation and Coding Scheme
MTC Machine Type Communication
PCT Patent Cooperation Treaty
PDSCH Physical Downlink Shared Channel
PRB Physical Resource Block
SINR Signal to Interference plus Noise Ratio
SR Scheduling Request
TBS Transport Block Size
TS Technical Specification
UE User Equipment Those skilled in the art will recognize improvements and modifications to the embodiments of the present disclosure. All such improvements and modifications are considered within the scope of the concepts disclosed herein and the claims that follow.

What is claimed is:

1. A method of operation of a node of a wireless communications system, comprising:
   determining a Modulation and Coding Scheme, MCS, that is optimized for Machine Type Communication, MTC, for one of an uplink from a MTC device to a base station and a downlink from the base station to the MTC device, wherein the determination comprises one of:
      obtaining or selecting an initial MCS based on a target block error rate for non-MTC devices, the initial MCS corresponding to an initial transport block size; and
      reducing the MCS from the initial MCS to a less aggressive MCS that satisfies a reduced transport block size, as compared to the initial transport block size, desired for the MTC device; and
   using the MCS with respect to the one of the uplink from the MTC device to the base station and the downlink from the base station to the MTC device.

2. The method of claim 1 wherein:
   determining the MCS comprises determining the MCS that is optimized for MTC for the uplink from the MTC device to the base station; and
   using the MCS comprises using the MCS with respect to the uplink from the MTC device to the base station.

3. The method of claim 2 wherein determining the MCS that is optimized for MTC for the uplink comprises determining the MCS that is optimized for MTC for the uplink based on a MTC-specific transport block size selection.

4. The method of claim 2 wherein the initial MCS is an initial uplink MCS.

5. The method of claim 3 further comprising decreasing an uplink transmit power for uplink data transmissions from the MTC device to the base station using the MCS that is optimized for MTC for the uplink such that a block error rate for the uplink data transmissions is equal to a target block error rate for MTC devices, wherein the target block error rate for MTC devices is less than a target block error rate for non-MTC devices.

6. The method of claim 2 wherein the node is the MTC device.

7. The method of claim 6 further comprising:
   receiving an uplink grant from a base station of the wireless communications system containing an indication that the MTC device is permitted to determine and use the MCS optimized for MTC devices for a corresponding uplink data transmission;
   wherein determining the MCS that is optimized for MTC for the uplink and using the MCS with respect to the uplink are performed upon receiving the uplink grant containing the indication that the MTC device is permitted to determine and use the MCS optimized for MTC devices for the corresponding uplink data transmission.

8. The method of claim 7 further comprising, prior to receiving the uplink grant, transmitting a scheduling request to the base station containing an indication that the MTC device would like to determine and use the MCS that is optimized for MTC for the uplink.

9. The method of claim 6 wherein, using the MCS with respect to the uplink comprises transmitting uplink data using the MCS.

10. The method of claim 9 further comprising transmitting an indication of the MCS to the base station.

11. The method of claim 2 wherein the node is the base station.

12. The method of claim 11 wherein using the MCS with respect to the uplink from the MTC device to the base station comprises:
   transmitting an uplink grant to the MTC device comprising an indication of the MCS; and
   receiving an uplink data transmission from the MTC device using the MCS.

13. The method of claim 11 further comprising:
   determining that the MTC device is a MTC device;
   wherein determining the MCS that is optimized for MTC for the uplink and using the MCS with respect to the uplink are performed upon determining that the MTC device is a MTC device.

14. The method of claim 13 wherein determining that the MTC device is a MTC device comprises determining that the MTC device is a MTC device based on at least one of a group consisting of: an indication in a scheduling request received from the MTC device, subscription information for the MTC device, a context of the MTC device, and physical resources utilized by the MTC device that are indicative of the MTC device being a MTC device.

15. The method of claim 1 wherein:
   determining the MCS comprises determining the MCS that is optimized for MTC for the downlink from the base station to the MTC device; and
   using the MCS comprises using the MCS with respect to the downlink from the base station to the MTC device.

16. The method of claim 15 wherein the initial MCS is an initial downlink MCS.

17. The method of claim 16 further comprising decreasing a downlink transmit power for downlink data transmissions from the base station to the MTC device using the MCS that is optimized for MTC for the downlink such that a block error rate for the downlink data transmissions is equal to a target block error rate for MTC devices, wherein the target block error rate for MTC devices is less than the target block error rate for non-MTC devices.

18. A node for a wireless communications system, comprising:
   at least one communication interface;
   at least one processor; and
   memory containing instructions executable by the at least one processor whereby the node is operative to:
      determine a Modulation and Coding Scheme, MCS, that is optimized for Machine Type Communication, MTC, for one of an uplink from a MTC device to a base station and a downlink from the base station to the MTC device wherein, in order to determine the MCS that is optimized for MTC for the uplink, the node is further operative to, via execution of the instructions by the at least one processor:
         obtain an initial uplink MCS based on a target block error rate for non-MTC devices, the initial uplink MCS corresponding to an initial transport block size; and
         reduce the MCS from the initial uplink MCS to a less aggressive uplink MCS that satisfies a reduced transport block size, as compared to the initial transport block size, desired for the MTC device; and
      use the MCS with respect to the one of the uplink from the MTC device to the base station and the downlink from the base station to the MTC device.

19. The node of claim 18 wherein:
   the MCS is optimized for MTC for the uplink from the MTC device to the base station; and
   the MCS is used with respect to the uplink from the MTC device to the base station.

20. The node of claim 18 wherein, via execution of the instructions by the at least one processor, the node is further operative to determine the MCS that is optimized for MTC for the uplink based on a MTC-specific transport block size selection.

21. The node of claim 18 wherein, via execution of the instructions by the at least one processor, the node is further operative to:
   decrease an uplink transmit power for uplink data transmissions from the MTC device to the base station using the MCS that is optimized for MTC for the uplink such that a block error rate for the uplink data transmissions is equal to a target block error rate for MTC devices, wherein the target block error rate for MTC devices is less than the target block error rate for non-MTC devices.

22. The node of claim 18 wherein:
   the MCS is optimized for MTC for the downlink from the base station to the MTC device; and
   the MCS is used with respect to the downlink from the base station to the MTC device.

23. A method of operation of a base station in a cellular communications network, comprising:
   transmitting an uplink grant to a Machine Type Communication, MTC, device, the uplink grant comprising an indication of an initial Modulation and Coding Scheme, MCS, wherein the initial MCS is based on a target block error rate for non-MTC devices and the initial MCS corresponds to an initial transport block size;
   receiving an uplink data transmission from the MTC device, the uplink data transmission using an unknown MCS that is less aggressive than the initial MCS indicated in the uplink grant that satisfies a reduced transport block size, as compared to the initial transport block size, desired for the MTC device; and
   detecting the unknown MCS used for the uplink data transmission from the MTC device.

24. The method of claim 23 wherein detecting the unknown MCS comprises:
   determining that decoding of the uplink data transmission using the initial MCS failed; and
   upon determining that decoding of the uplink data transmission using the initial MCS failed, attempting to decode the uplink data transmission using a more robust MCS.

25. A base station for operation in a cellular communications network, comprising:
   at least one radio unit;
   at least one processor; and
   memory containing instructions executable by the at least one processor whereby the base station is operative to:
      transmit, via the at least one radio unit, an uplink grant to a Machine Type Communication, MTC, device, the uplink grant comprising an indication of an initial Modulation and Coding Scheme, MCS, wherein the initial MCS is based on a target block error rate for non-MTC devices and the initial MCS corresponds to an initial transport block size;
      receive, via the at least one radio unit, an uplink data transmission from the MTC device, the uplink data transmission using an unknown MCS that is less aggressive than the initial MCS indicated in the uplink grant that satisfies a reduced transport block size, as compared to the initial transport block size, desired for the MTC device; and
      detect the unknown MCS used for the uplink data transmission from the MTC device.

26. The base station of claim 25 wherein, in order to detect the unknown MCS, the base station is further operative to:
   determine that decoding of the uplink data transmission using the initial MCS failed; and
   attempt to decode the uplink data transmission using a more robust MCS upon determining that decoding of the uplink data transmission using the initial MCS failed.

* * * * *